US006889210B1

(12) United States Patent
Vainstein

(10) Patent No.: US 6,889,210 B1
(45) Date of Patent: May 3, 2005

(54) METHOD AND SYSTEM FOR MANAGING SECURITY TIERS

(75) Inventor: Klimenty Vainstein, Cupertino, CA (US)

(73) Assignee: PSS Systems, Inc., Palo Alto, CA (US)

(*) Notice: Subject to any disclaimer, the term of this patent is extended or adjusted under 35 U.S.C. 154(b) by 51 days.

(21) Appl. No.: 10/445,657

(22) Filed: May 27, 2003

Related U.S. Application Data

(63) Continuation-in-part of application No. 10/076,254, filed on Feb. 12, 2002.
(60) Provisional application No. 60/339,634, filed on Dec. 12, 2001.

(51) Int. Cl.[7] .............................................. G06F 17/60
(52) U.S. Cl. .......................... 705/57; 705/50; 705/51; 380/201; 380/202; 713/166
(58) Field of Search .............................. 705/54, 50, 51, 705/52, 58, 64, 71, 75; 380/201, 228, 200, 202; 713/166, 200, 201, 202

(56) References Cited

U.S. PATENT DOCUMENTS

| 5,058,164 A | * | 10/1991 | Elmer et al. | 713/190 |
| 5,406,628 A | * | 4/1995 | Beller et al. | 380/30 |
| 6,505,300 B2 | * | 1/2003 | Chan et al. | 713/164 |

FOREIGN PATENT DOCUMENTS

| JP | 02001036517 A | * | 2/2001 |

OTHER PUBLICATIONS

IBM Technical Disclosure bulletin; Oct. 2001 UK; Expiration mechanism for chipcards.*

* cited by examiner

*Primary Examiner*—Pierre E Elisca
(74) *Attorney, Agent, or Firm*—Carr & Ferrell LLP

(57) ABSTRACT

Techniques for reorganizing security levels without implicating accessibility to secured files classified in accordance to one of the security levels are disclosed. In a case of adding a new security level, the controllability or restrictiveness of the new security level is determined with respect to the most restrictive security level or the least security level in a set of existing security levels. A set of proper security parameters are then generated for the new security level and subsequently the existing security levels are reorganized to accommodate the new security level. In a case of removing a security level from the existing security levels, the security parameters for the security level to be deleted are either folded up or down to an immediate next security level, depending on implementation. As a result, the security parameters for the immediate next security level are updated to include those for the security level to be deleted such that the secured files classified at the security level to be deleted can still be accessed by those with proper clearance levels.

19 Claims, 12 Drawing Sheets

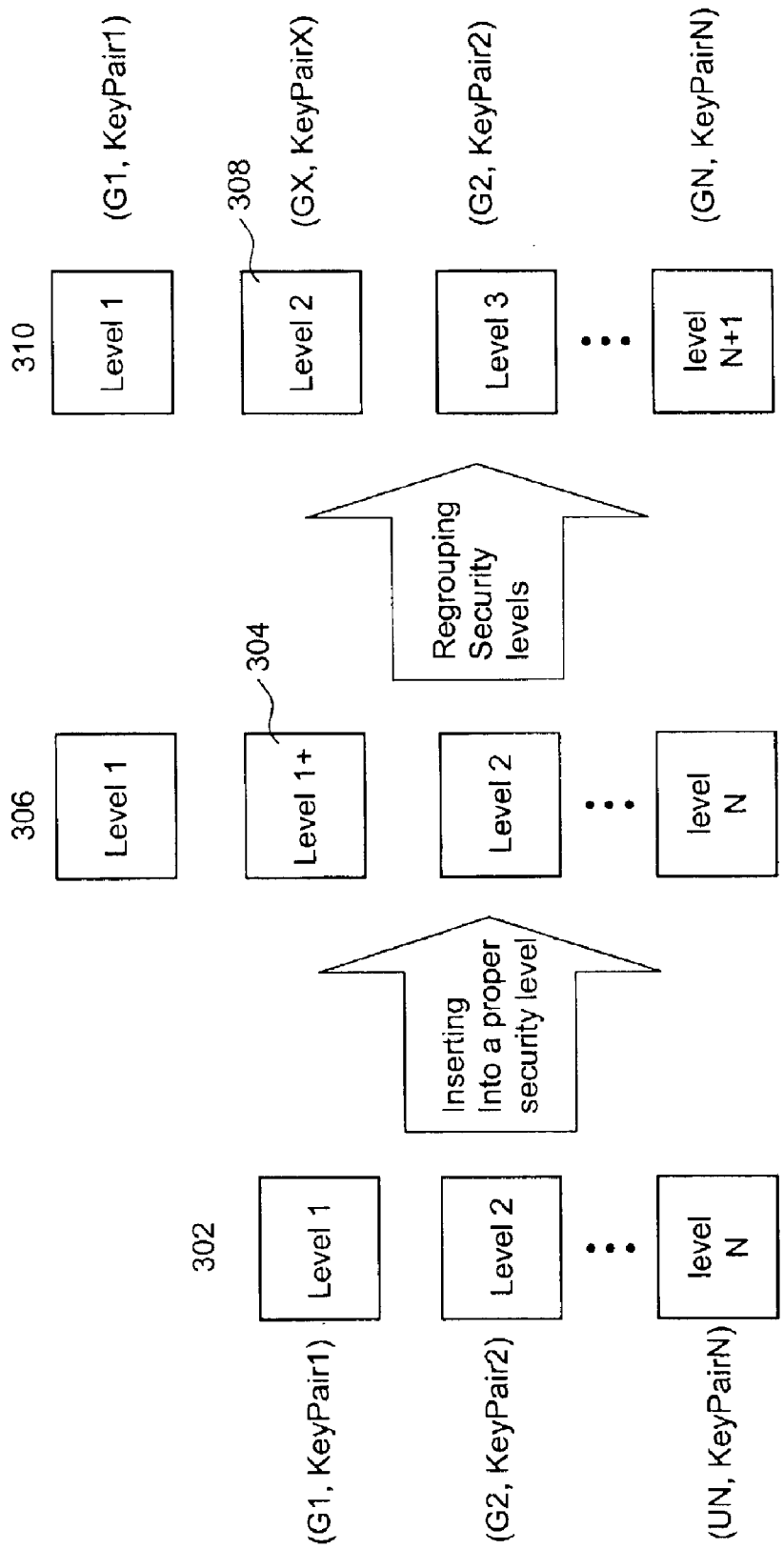

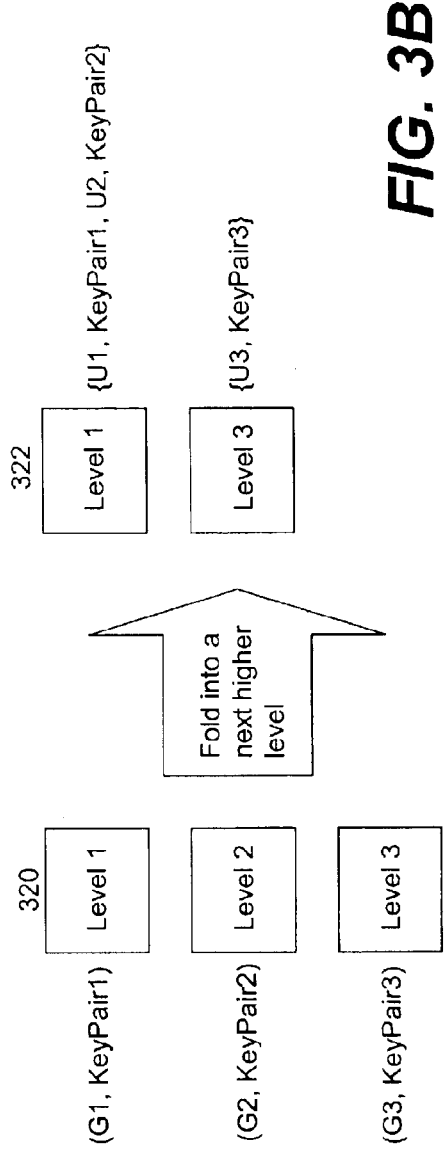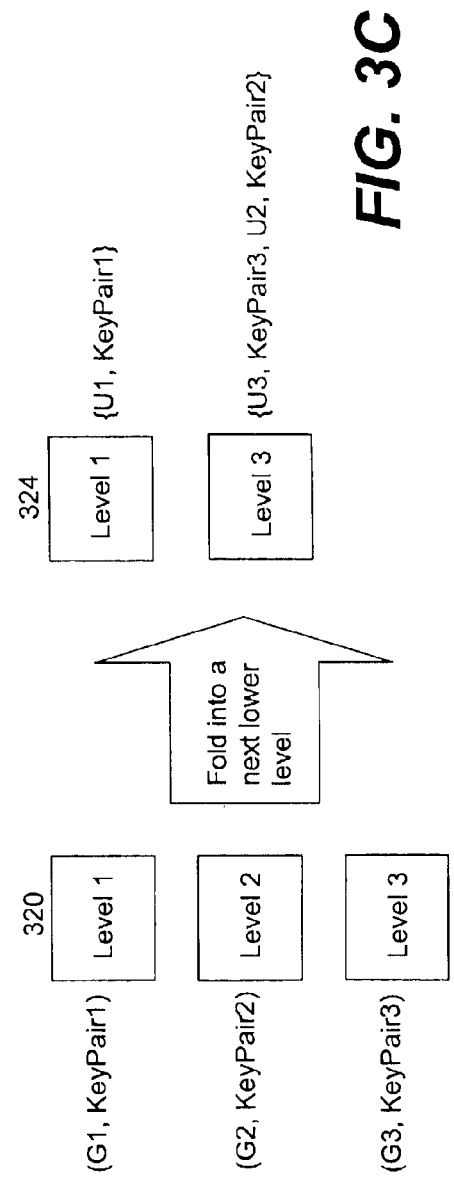

METHOD AND SYSTEM FOR MANAGING SECURITY TIERS

CROSS-REFERENCE TO RELATED APPLICATION

This application is a continuation-in-part of co-pending U.S. patent application Ser. No. 10/076,254, filed Feb. 12, 2002, that claims the benefits of U.S. provisional application No. 60/339,634 filed Dec. 12, 2001. The application is also related to U.S. patent application Ser. No. 10/159,537 and entitled "Method and Apparatus for Securing Digital Assets", which is hereby incorporated by reference.

BACKGROUND OF THE INVENTION

1. Field of the Invention

The present invention relates to the area of protecting data in an enterprise environment, and more particularly, relates to a method and system for managing security tiers or levels without implicating accessibilities to secured files classified according to a security level.

2. Description of Related Art

The Internet is the fastest growing telecommunications medium in history. This growth and the easy access it affords have significantly enhanced the opportunity to use advanced information technology for both the public and private sectors. It provides unprecedented opportunities for interaction and data sharing among businesses and individuals. However, the advantages provided by the Internet come with a significantly greater element of risk to the confidentiality and integrity of information. The Internet is a widely open, public and international network of interconnected computers and electronic devices. Without proper security means, an unauthorized person or machine may intercept any information traveling across the Internet and even get access to proprietary information stored in computers that interconnect to the Internet, but are otherwise generally inaccessible by the public.

There are many efforts in progress aimed at protecting proprietary information traveling across the Internet and controlling access to computers carrying the proprietary information. Cryptography allows people to carry over the confidence found in the physical world to the electronic world, thus allowing people to do business electronically without worries of deceit and deception. Every day hundreds of thousands of people interact electronically, whether it is through e-mail, e-commerce (business conducted over the Internet), ATM machines, or cellular phones. The perpetual increase of information transmitted electronically has lead to an increased reliance on cryptography.

One of the ongoing efforts in protecting the proprietary information traveling across the Internet is to use one or more cryptographic techniques to secure a private communication session between two communicating computers on the Internet. The cryptographic techniques provide a way to transmit information across an insecure communication channel without disclosing the contents of the information to anyone eavesdropping on the communication channel. Using an encryption process in a cryptographic technique, one party can protect the contents of the data in transit from access by an unauthorized third party, yet the intended party can read the data using a corresponding decryption process.

A firewall is another security measure that protects the resources of a private network from users of other networks. However, it has been reported that many unauthorized accesses to proprietary information occur from the inside, as opposed to from the outside. An example of someone gaining unauthorized access from the inside is when restricted or proprietary information is accessed by someone within an organization who is not supposed to do so. Due to the open nature of the Internet, contractual information, customer data, executive communications, product specifications, and a host of other confidential and proprietary intellectual property, remains available and vulnerable to improper access and usage by unauthorized users within or outside a supposedly protected perimeter.

In fact, many businesses and organizations have been looking for effective ways to protect their proprietary information. Typically, businesses and organizations have deployed firewalls, Virtual Private Networks (VPNs), and Intrusion Detection Systems (IDS) to provide protection. Unfortunately, these various security means have been proven insufficient to reliably protect proprietary information residing on private networks. For example, depending on passwords to access sensitive documents from within often causes security breaches when the password of a few characters long is leaked or detected. Therefore, there is a need to provide more effective ways to secure and protect digital assets at all times.

When a security system is employed to secure files, it is sometimes desirable to classify the secured files according to a security level, for example, "top secret", "secret" or "confidential". When there is a need to add or delete additional security levels, the secured files originally classified should be still accessible. Thus there is a need for solutions that can manage the security levels dynamically without implicating accessibility to the secured files.

SUMMARY OF INVENTION

This section is for the purpose of summarizing some aspects of the present invention and to briefly introduce some preferred embodiments. Simplifications or omissions in this section as well as in the abstract may be made to avoid obscuring the purpose therefor. Such simplifications or omissions are not intended to limit the scope of the present invention.

The present invention is related to processes, systems, architectures and software products for providing pervasive security to digital assets at all times and is particularly suitable in an inter/intra enterprise environment. In general, pervasive security means that digital assets are secured at all times and can only be accessed by authenticated users with appropriate access rights or privileges, and proper security clearance in some cases, wherein the digital assets may include, but not be limited to, various types of documents, multimedia files, data, executable code, images and texts. According to one aspect of the present invention, secured files are in a secured form that only those with granted access rights can access. Even with the proper access privilege, when a secured file is classified, at least a security clearance key is needed to ensure those who have the right security clearance can ultimately access the contents in the classified secured file.

According to one aspect of the present invention, a new security level is to be inserted into a set of existing security levels. For example, a security level "secret" is added between the existing security levels "top secret" and "confidential", resulting in a new set of security levels, "top secret", "secret" and "confidential". Without implicating the accessibility to secured files classified at one of the existing security levels, the controllability or restrictiveness of the new security level is determined with respect to the most restrictive security level or the least security level in the existing security levels. A set of proper security parameters are generated for the new security level and subsequently the existing security levels are mapped to accommodate the new security level.

According to another aspect of the present invention, a security level is removed from a set of existing security levels. For example, a security level "secret" is removed from the existing security levels "top secret", "secret" and "confidential", resulting in a new set of security levels including only "top secret" and "confidential". Without implicating the accessibility to secured files classified at one of the existing security levels, the security parameters for the security level to be deleted are either folded up or down to an immediate next security level, depending on implementation. As a result, the security parameters for the immediate next security level are augmented to include those for the security level to be deleted such that the secured files classified at the security level to be deleted can still be accessed by those with proper clearance levels.

Depending on implementation and application, the present invention may be implemented in software, hardware or both in combination, and employed in a client machine or a server machine. According to one embodiment, the present invention is implemented in an executable form loaded in a computing device and activated when the security tiers or levels are changed to provide particular needs of an organization or organizations.

The present invention can be implemented as a method, a system, a process, software medium or other form, each yielding one or more of the following features, benefits and advantages. One of the features, benefits and advantages is the management mechanism of security levels in a security system, the mechanism provides flexibility in reorganizing security levels without implicating accessibility to secured files originally classified. Another one of the features, benefits and advantages is that secured files originally classified at a security level to be deleted can still be accessed by properly folding the security level to a next immediate security level.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 3A illustrates a set of security levels in a security system employed in an enterprise, a new security level being inserted to the existing security level;

FIG. 3B and FIG. 3C each illustrate a case in which a security level is folded into another security level;

DETAILED DESCRIPTION OF THE PREFERRED EMBODIMENTS

Figure 1:
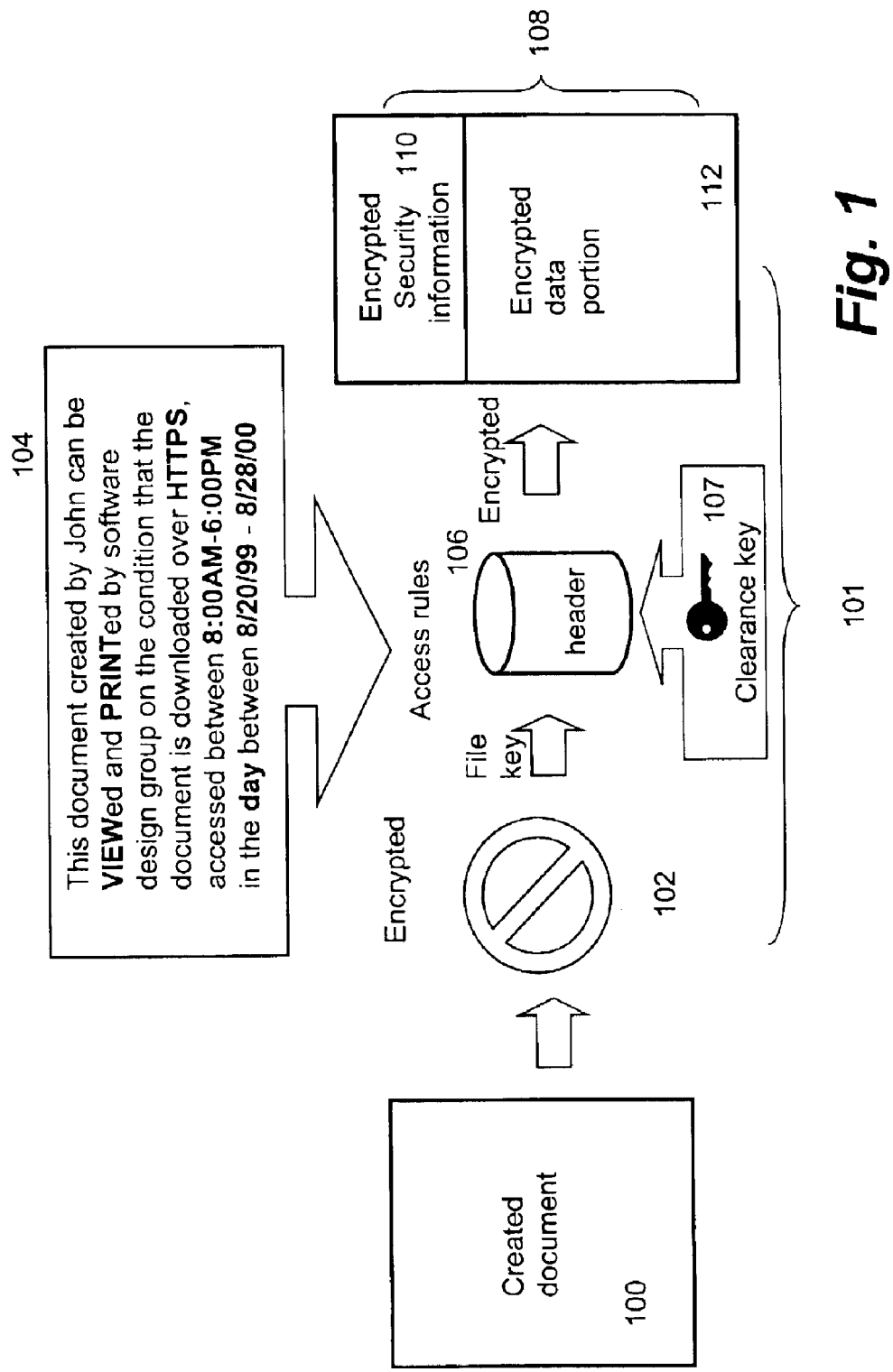
FIG. 1 shows a diagram of securing a created document according to one exemplary secured file form used in the present invention.

The present invention pertains to a process, a system, a method and a software product for securing electronic data or digital assets. According to one aspect of the present invention, a new security level is to be inserted into a set of existing security levels. Without implicating the accessibility to secured files classified at one of the existing security levels, the controllability or restrictiveness of the new security level is determined with respect to the most restrictive security level or the least security level in the existing security levels. A set of proper security parameters are generated for the new security level and subsequently the existing security levels are mapped to accommodate the new security level. According to another aspect of the present invention, a security level is removed from a set of existing security levels. The security parameters for the security level to be deleted are either folded up or down to an immediate next security level, depending on implementation. As a result, the security parameters for the immediate next security level are augmented to include those for the security level to be deleted such that the secured files classified at the security level to be deleted can still be accessed by those with proper clearance levels.

There are numerous advantages, benefits, and features in the present invention. One of them is the mechanism contemplated herein capable of providing pervasive security to digital assets sought to be protected at all times. Another one is that the digital assets are presented in such a way that only those with proper access privilege as well as sufficient security clearance level can access information in the digital assets. Other advantages, benefits, and features in the present invention can be readily appreciated by those skilled in the art from the detailed description of the invention provided herein.

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1–4B. However, those skilled in the art will readily appreciate that the detailed description given herein with respect to these figures is for explanatory purposes as the invention extends beyond these limited embodiments.

Generally, a content created by a creator for the purpose of an entity is an intellectual property belonging to the creator or the entity. In an enterprise, any kind of information or intellectual property can be content, though it is commonly referred to as "information" instead of "content". In either case, content or information is independent of its format, it may be in a printout or an electronic document. As used herein, content or information exists in a type of electronic data that is also referred to as a digital asset. A representation of the electronic data may include, but not be limited to, various types of documents, multimedia files, streaming data, dynamic or static data, executable code, images and texts.

To prevent contents in electronic data from an unauthorized access, the electronic data is typically stored in a form that is as close to impossible as possible to read without a priori knowledge. Its purpose is to ensure privacy by keeping the content hidden from anyone for whom it is not intended, even those who have access to the electronic data. Example of a priori knowledge may include, but not be limited to, a password, a secret phrase, biometric information or one or more keys.

FIG. 1 shows an illustration diagram of securing a created document 100 according to one embodiment of the present invention. One of the purposes of creating a secured file 108 is to ensure that the contents in the document 100 can be only accessed by or revealed to an authorized user with proper access privilege. As used herein, the user may mean a human user, a software agent, a group of users or a member thereof, a device and/or application(s). Besides a human user who needs to access a secured document, a software application or agent sometimes needs to access the secured document in order to proceed forward. Accordingly, unless specifically stated, the "user" as used herein does not necessarily pertain to a human being.

After the document 100 is created, edited or opened with an application or authoring tool (e.g., Microsoft WORD), upon an activation of a command, such as "Save," "Save As" or "Close", or automatic saving invoked by an operating system, the application itself, or an approved application, the created document 100 is caused to undergo a securing process 101. The securing process 101 starts with an encryption process 102, namely the document 100 that has been created or is being written into a store is encrypted by a cipher (e.g., an encryption process) with a file key (i.e., a cipher key). In other words, the encrypted data portion 112 could not be opened without the file key. For the purpose of controlling the access to the contents in the document 100 or the resultant secured file 108, the file key or keys may be the same or different keys for encryption and decryption and are included as part of security information contained in or pointed to by a header 106. The file key or keys, once obtained, can be used to decrypt the encrypted data portion 112 to reveal the contents therein.

To ensure that only authorized users or members of an authorized group can access the secured file 108, a set of access rules 104 (an example is shown in the figure) for the document 100 is received or created and associated with the header 106. In general, the access rules 104 determine or regulate who and/or how the document 100, once secured, can be accessed. In some cases, the access rules 104 also determine or regulate when or where the document 100 can be accessed. In addition, security clearance information 107 is added to the header 106 if the secured file 108 is classified. In general, the security clearance information 107 is used to determine a level of access privilege or security level of a user who is attempting to access the contents in the secured file 108. For example, a secured file may be classified as "Top secret", "Secret", "Confidential", and "Unclassified".

According to one embodiment, the security clearance information 107 includes another layer of encryption of the file key with another key referred to herein as a clearance key. An authorized user must have a clearance key of proper security level in addition to an authenticated user key and proper access privilege to retrieve the file key. As used herein, a user key or a group key is a cipher key assigned to an authenticated user and may be used to access a secured file or secure a file, or create a secured file. The detail of obtaining such a user key upon a user being authenticated is provided in U.S. patent application Ser. No. 10/074,804.

According to another embodiment, the security clearance information 107 includes a set of special access rules to guard the file key. The retrieval of the file key requires that the user passes an access rule measurement. Since access privilege of a user may be controlled via one or more system parameters (e.g., a policy), the access rule measurement can determine if the user has sufficient access privilege to retrieve the file key in conjunction with the corresponding user key. With the detailed description to follow, those skilled in the art can appreciate that other forms of the security clearance information 107 may be possible. Unless otherwise specified, the following description is based on the security clearance information 107 being another layer of encryption with one or more clearance keys.

In accordance with the security clearance information 107, a user may be assigned a hierarchical security clearance level based on, perhaps, a level of trust assigned to the user. A level of trust implies that one user may be more trusted than another and hence the more trusted user may access more classified files. Depending on implementation, a level of trust may be based on job responsibility of the user or a role of the user in a project or an organization background checks, psychological profiles, or length of service, etc. In any case, a level of trust assigned to the user augments additional aspect to the access privilege of the user such that the user must have proper security clearance to access a classified secured file even if the user is permitted by the access rules to access the file.

As will be further described in detail below, unless the level of security clearance of the user permits, a secured classified file (i.e., the file that is both secured and classified) may not be accessed even if the user has an authenticated user (or group) key and permitted by the access rules in the secured classified file. In one embodiment, the level of security clearance of the user is determined by one or more clearance keys assigned thereto. In general, a clearance key permits a user to access a secured file classified as "top secret", the same clearance key may permit the user to access all secured files classified less secure, such as "secret" or "confidential", where it has been assumed that the user has proper access privilege to be granted by the access rules in the file. In one embodiment, a clearance key is further secured by means of secondary authentication, such as re-login, biometric information verification and a second password. In other words, a clearance key may not be automatically released to or activated for a user upon an authenticated login, unless the user provides additional information.

In general, a header is a file structure, preferably small in size, and includes, or perhaps links to, security information about a resultant secured document. Depending on an exact implementation, the security information can be entirely included in a header or pointed to by a pointer that is included in the header. According to one embodiment, the access rules 104, as part of the security information, are included in the header 106. The security information further includes the file key and/or one or more clearance keys, in some cases, an off-line access permit (e.g. in the access rules) should such access be requested by an authorized user. The security information is then encrypted by a cipher (i.e., an en/decryption scheme) with a user key associated with an authorized user to produce encrypted security information 110. The encrypted header 106, if no other information is added thereto, is attached to or integrated with the encrypted data portion 112 to generate the resultant secured file 108. In a preferred embodiment, the header is placed at the beginning of the encrypted document (data portion) to facilitate an early detection of the secured nature of a secured file. One of the advantages of such placement is to enable an access application (i.e., an authoring or viewing tool) to immediately activate a document securing module (to be described where it deems appropriate) to decrypt the header if permitted. Nevertheless, there is no restriction as to where the encrypted header 106 is integrated with the encrypted data portion 112.

It is understood that a cipher may be implemented based on one of many available encryption/decryption schemes. Encryption and decryption generally require the use of some secret information, referred to as a key. For some encryption mechanisms, the same key is used for both encryption and decryption; for other mechanisms, the keys used for encryption and decryption are different. In any case, data can be encrypted with a key according to a predetermined cipher (i.e., encryption/decryption) scheme. Examples of such schemes may include, but not be limited to, Data Encryption Standard algorithm (DES), Blowfish block cipher and Twofish cipher. Therefore, the operations of the present invention are not limited to a choice of those commonly-used encryption/decryption schemes. Any cipher scheme that is effective and reliable may be used. Hence, the details of a particular scheme are not further discussed herein so as to avoid obscuring aspects of the present invention.

In essence, the secured document 108 includes two parts, the encrypted data portion 112 (i.e., encrypted version of the document itself) and the header 110 that may point to or include security information for the secured document 108. To access the contents in the encrypted data portion 112, one needs to obtain the file key to decrypt the encrypted data portion 112. To obtain the file key, one needs to be authenticated to get a user or group key and pass an access test in which at least the access rules in the security information are measured against the user's access privilege (i.e., access rights). If the secured file is classified, it further requires a security level clearance on the user. In general, the security clearance level of the user must be high enough before the file key can be retrieved. Alternatively, part of the access rules may be left non-encrypted for users authorized or non-authorized alike to view embedded access permissions of a secured file in a display application or markup language interpreter (e.g., a browser).

Figure 2A:
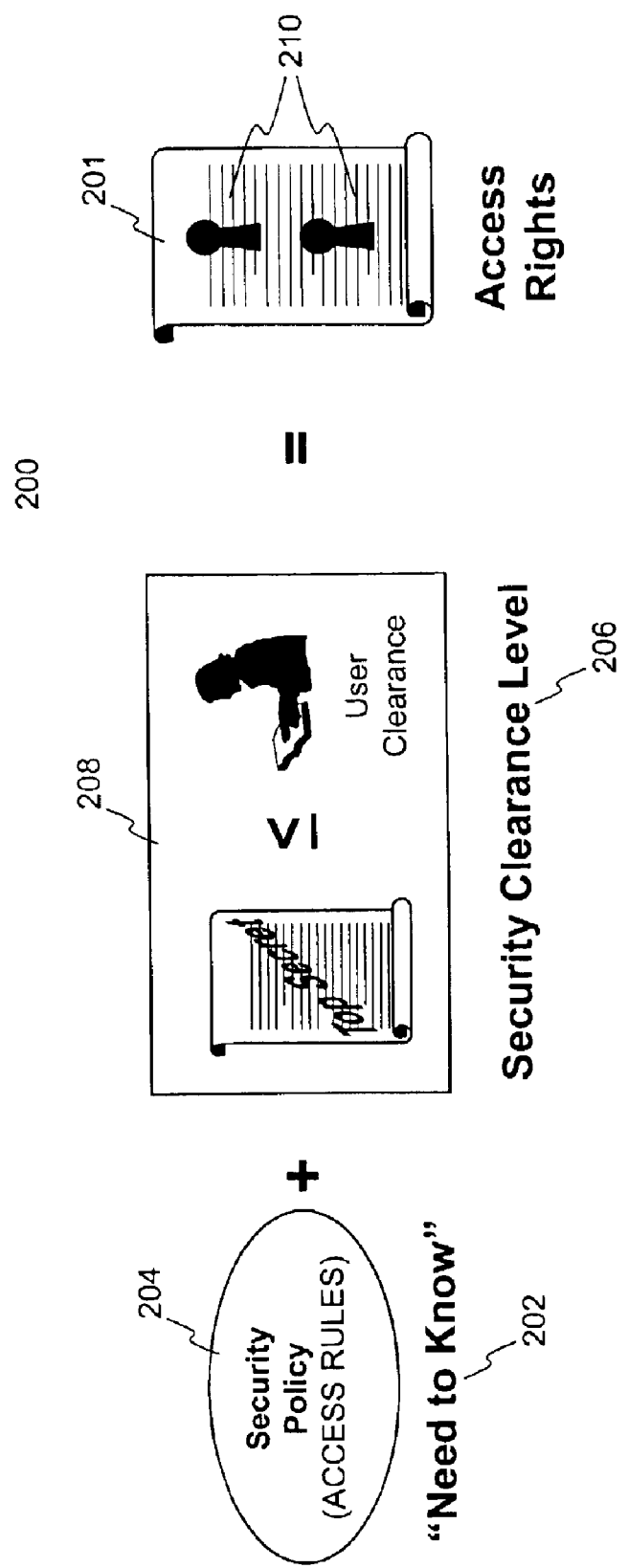
FIG. 2A shows a diagram of what is referred to herein as a two-pronged access scheme according to one embodiment of the present invention.

FIG. 2A shows a diagram 200 of what is referred to herein as a two-pronged access scheme according to one embodiment of the present invention. To access a secured file 201, a user needs to have access privilege based on a condition of "need to know" 202 that is to be measured against by the access rules 204 embedded in the secured file 201. If the secured file 201 is classified, the user must also have a higher security clearance level 206 that is measured against by the security clearance information 206 (e.g., one or more clearance keys. In other words, there are at least two key holes 210 that must be "inserted" with two proper keys before the secured classified file can be accessed.

Figure 2B:
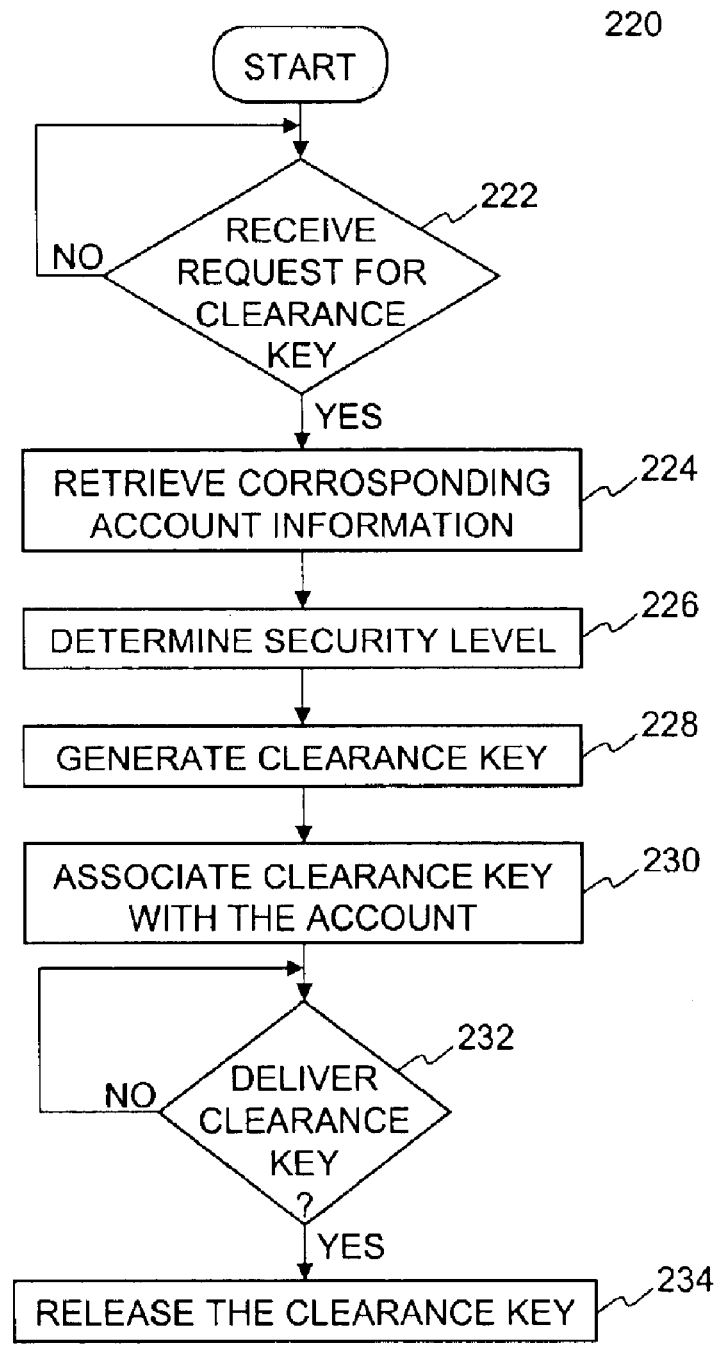
FIG. 2B shows a flowchart of a process for granting a proper security clearance level (i.e., a clearance key) according to one embodiment of the present invention.

FIG. 2B shows a flowchart 220 of process for granting a proper security clearance level (i.e., a clearance key) according to one embodiment of the present invention. The process 220 can be initiated with a request for a clearance key. Depending on implementation, the process 220 may be implemented in a machine (e.g., a central server, a local server or a client machine) that provides access control management to all secured files, perhaps, in an inter/intra enterprise environment, or a combination of a local client machine used by users and the machine.

At 222, the process 220 awaits a request for a clearance key. It is described that a secured file can be classified or unclassified. When it is determined that a user needs to access a secured file that is classified at a security level, such request is provided to activate the process 220. In general, the request pertains to a specific user or some members in a group. At 224, a corresponding account for the user is retrieved, provided there is the account for the user. If the account is not available, then the account shall be opened accordingly. Alternatively, the process 220 may be part of the process of opening an appropriate account for a user who has the need-to-know basis to access secured files at certain security or confidential level(s). Depending on implementation, the corresponding account information may include a username or identifier, membership information, designated access privilege, and a corresponding user key (which sometimes is a pair of a private key and a public key). At 226, a security level for the user is determined, which is usually done by the necessity. For example, an executive of an enterprise may be assigned the highest security clearance level and a front desk receptionist may be assigned the lowest security clearance level. Once the security level is determined, a clearance key is generated at 228.

Figure 2C:
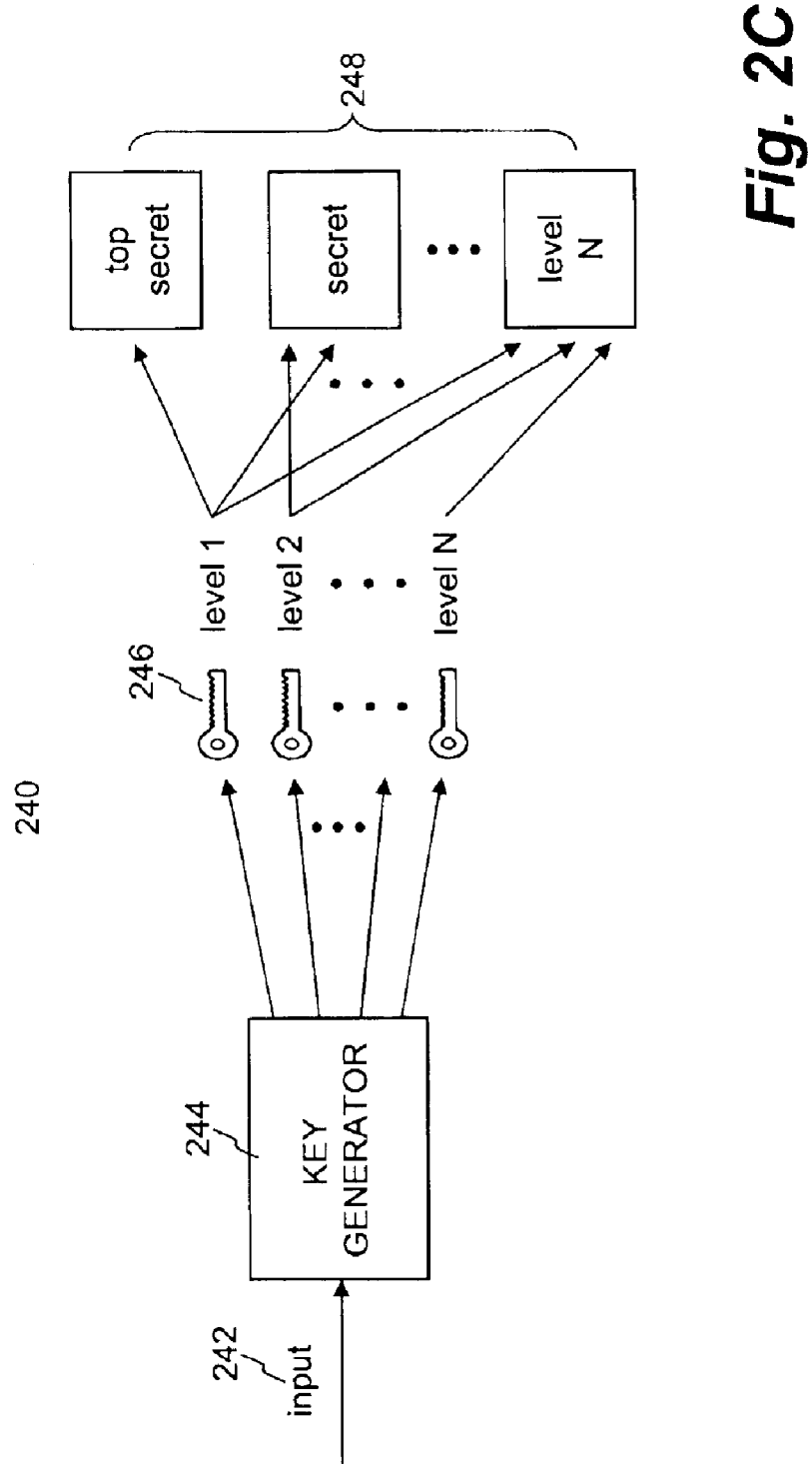
FIG. 2C shows a diagram of generating a clearance key according to one embodiment of the present invention.

Referring now to FIG. 2C, there is shown a diagram 240 of generating a clearance key according to one embodiment of the present invention. A key generator 244 receives one or more parameters 242 controlling the security level determined at 226 of FIG. 2B to generate a sequence of alphanumeric characters or binary numbers as a key. Whether using a secret-key cryptosystem or a public-key cryptosystem, one needs a good source of random numbers for key generation. The main features of a good source are that it produces numbers that are unknown and unpredictable by potential adversaries. There are many ways to generate such numbers, for example, random numbers can be obtained from a physical process. Another approach is to use a pseudo-random number generator fed by a random seed. In any case, depending on the input 242, the generator 244 is configured to generate a clearance key of proper security level. In one embodiment, the key generator 244 generates keys 246 of different lengths or forms, each of the keys 246 corresponds to a security level, such as level 1 (highest security), level 2, . . . , level N (lowest security). In another embodiment, each of the keys 246 generated by the key generator 244 is embedded with a signature signifying a security level. Other methods of specifying a security level of a clearance key are possible. Although it is possible to implement in such a way that each clearance key with a certain security level can only access secured files classified in the same security level, it is preferable to permit a clearance key with a higher security level to access secured files classified in the lower security levels. In other words, a clearance key in level 1 (i.e., the highest security level primarily designated to secured files classified as "top secret") can be used to access all secured classified files 248, while a clearance key in level 2 can be used to access all secured classified files 248 except for those classified as "top secret". Likewise, a clearance key in level N can be only used to access secured files in security level N. One of the advantages for such arrangement is that a user needs only to have one clearance key, if the user has the need to access those secured classified files.

Figure 2D:
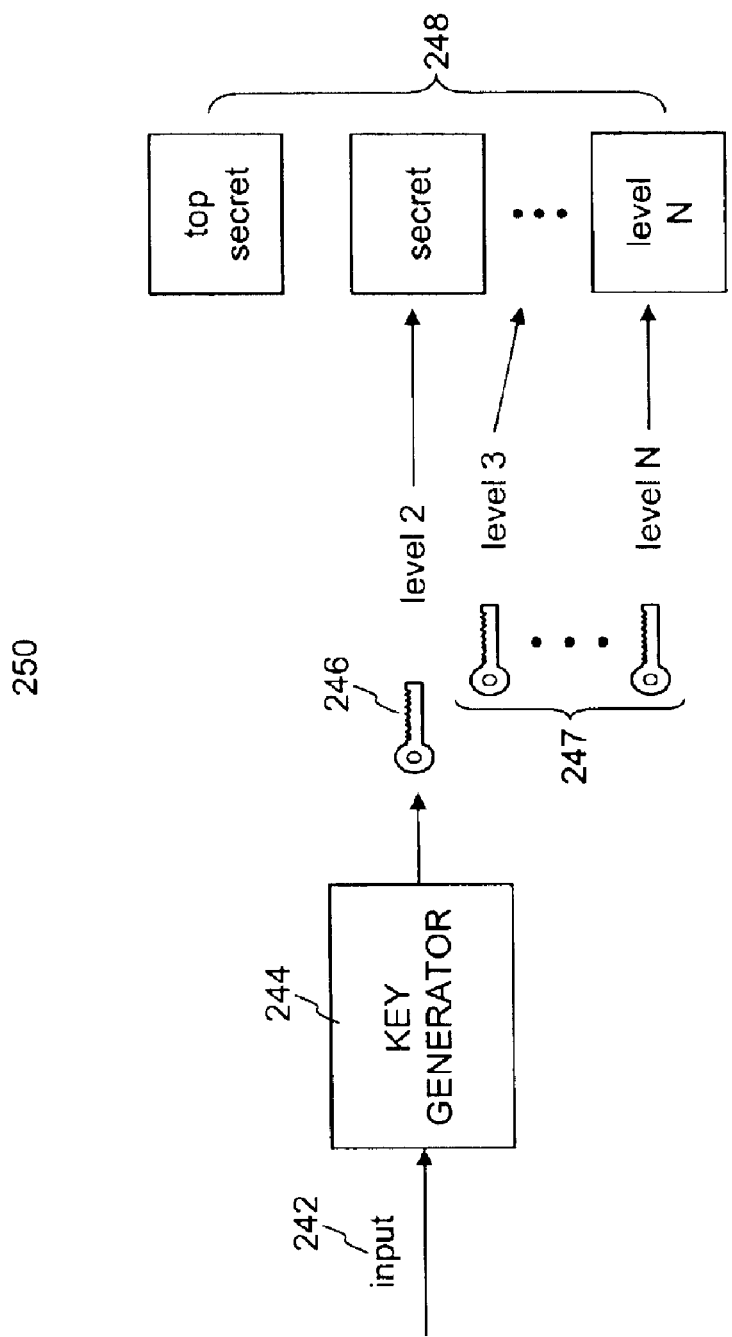
FIG. 2D shows a diagram of generating a clearance key according to another embodiment of the present invention.

FIG. 2D shows a diagram of generating a clearance key according to another embodiment of the present invention. The key generator 244 receives one or more parameters 242 controlling the security level determined at 226 of FIG. 2B to generate a number of sets of alphanumeric or binary numbers as a primary key 246 and auxiliary keys 247. The primary key 246 is the one being requested, generated in accordance with the determined security level and can be used to facilitate the access to a secured file classified at a security or confidentiality level. The auxiliary keys 247 are those keys generated to facilitate the access to secured files classified less than the security or confidentiality level. As shown in the figure, it is assumed that the primary key 246 is for accessing a secured file classified at level 2. Accordingly, the auxiliary keys 247 can be respectively used to access secured files classified level 3, level 4, . . . to level N, all less than level 2 in terms of security or confidentiality. To facilitate the description of the present invention, the following description is based on FIG. 2C and can be readily applied to FIG. 2D.

Returning to FIG. 2B, after a proper clearance key is generated at 228, the clearance key is associated with the account at 230 so that the user will use the correct key to access a secured file that requires a clearance key. The process 220 now awaits any call for the clearance key at 232. Depending on implementation, the clearance key may be stored locally or remotely and retrievlable only when there is a need for it to access a classified secured file. In some cases, the clearance key can only be retrievlable when a user passes a secondary authentication means. For example, a user is entitled to access certain secured files classified at least at a security level. The clearance key associated with the user may be configured to be protected by means of secondary authentication, such as biometric information verification or a second password, to increase security level of the clearance key. When a non-secured classified file is accessed, the clearance key is not needed and therefore will not be released to or activated for the user. When a secured classified file is accessed, the process 220 goes to 234, wherein the clearance key is released to the user to facilitate the retrieval of the file key in the secured file, provided the user has furnished necessary information or passed secondary authentication if needed.

Clearance keys provide flexibilities for a security system to control access by authorized users to secured files that are classified accordingly. However, when levels of the security are fixed, the flexibilities are limited. As one of the features in the present invention, the levels of security can be added or adjusted up or down in a security system without compromising the security of the secured files that have been previously classified.

FIG. 3A illustrates security levels 302 in a security system employed in an enterprise. In general, there are N levels of security for secured files under the security system, where N is a finite integer, each level requires a set of security parameters to access secured files classified to the level or other levels below this level. For example, a secured file SF is classified at security level 2. To access the secured file, users in a designated group G2 shall posses at least two keys, a user key (e.g., UK2) and a clearance key (e.g., CK2) corresponding to the security level 2. The designated group includes a user or users authorized to access the secured files classified at this level or levels below this level. The user key for each of the users, if there are more than one users in the designated group, may not be necessary identical, as one user may be from one user group and another user may be from a different group. To facilitate the description of the present invention, the access relationship may be expressed as: SF ∀ (group, security-level, CK), which means a secured and classified file SF can be accessed with valid parameters of a designated group, a security-level, a clearance key. In particular, SF ∀ (G2, level2, C<) means that users in a group designated as G2 can access secured files classed at level 2 with a clearance key CK2, provided that each of the users in G2 has a valid user key. Alternatively, SF ∀ (G2, level1, level2, CK2) means that users in a group designated as G2 can access secured files classified at level 1 or level 2 with a clearance key CK2, provided that each of the users in G2 has a valid user key. The first access relationship indicates that the secured file SF can only be accessed by users in a group G2 authorized to access secured files classified at the security level 2. The second access relationship indicates that secured files classified at the security level 2 or one level below the security level 2 can be accessed by users authorized to access secured files classified at the security level 2. Depending on implementation, either one of the access relationships may be implemented.

For simplified illustration purpose, the first access relationship is shown in the figures and the following description is based on the first access relationship. Those skilled in the art can understand the implementation of the second access relationship given the detailed description herein. When an additional security level 304 is added between the security levels 1 and 2, the groups and corresponding keys have to be reassigned without affecting the accessibility to other secured files originally classified. According to one embodiment, the security level 1 is the most restrictive level. Since the added level 304 is less restrictive than the security level 1 but more restrictive than level 2, as shown in FIG. 3A, the added level 304 is thus classified as a new security level 2 308. As a result, the rest of the original security levels, except for the security level 1, are reorganized, creating N+1 levels of security 310 and a new access relationship SF ∀ (GX, level 2, CKX), where GX is a newly authorized group to be permitted to access secured files at the security level 2 with a user key and the newly created clearance key CKX.

To maintain the accessibility of the originally authorized groups, the security levels are renumbered or remapped. If the original access relationship is SF ∀ (G2, level 2, CK2), there is now SF ∀ (G3, level 3, CK2), namely the original security level 2 is mapped to as security level 3.

FIG. 3B and FIG. 3C each illustrate a case in which a security level is folded into another security level. Originally, there are three security levels 320. Now the three security levels 320 are to be folded into two security levels 322 or 324. FIG. 3B shows the security levels 320 being folded up to an immediate next security level above, and FIG. 3C shows the security levels 322 being folded down to an immediate next security level below. In particular, in FIG. 3B, the security level 2 is to be folded into the security level 1, a higher security level. As a result of one security level being folded up, there are now two security levels 322. The authorization (i.e., security parameters) designated for the deleted security level (i.e., security level 2) need be merged with that for the security level 1. In other words, the original access relationships:

SF ∀ (G1, level 1, CK1);
SF ∀ (G2, level 2, CK2);
SF ∀ (G3, level 3, CK3);

are now correspondingly mapped to:

SF ∀ (G1, level 1, CK1, G2, level 2, CK2);
SF ∀ (G3, level 3, CK3).

In other words, those secured files classified at security level 2 can still be accessed by those with proper access privilege.

One the other hand, FIG. 3C shows the security level 2 is being folded to the security level 3. The authorization (i.e., security parameters) designated for the deleted security level (i.e., security level 2) need be merged with that for the security level 3. In other words, the original access relationships:

SF ∀ (G1, level 1, CK1);
SF ∀ (G2, level 2, CK2);
SF ∀ (G3, level 3, CK3);

are now correspondingly mapped to:

SF ∀ (G1, level 1, CK1);
SF ∀ (G3, level 3, CK3, G2, level 2, CK2).

In other words, those secured files classified at security level 2 can still be accessed by those with proper access privilege.

Figure 4A:
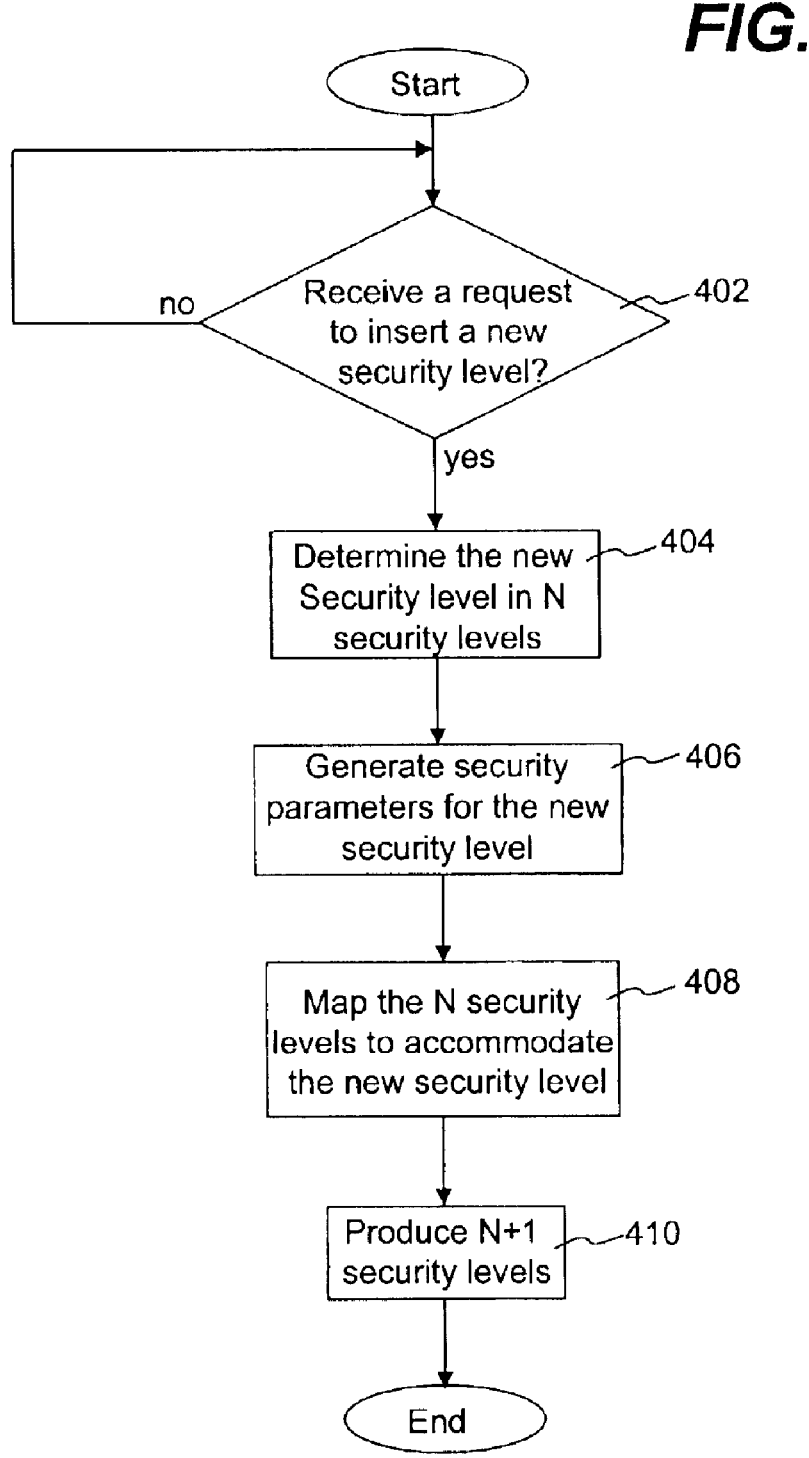
FIG. 4A shows a flowchart or process of inserting a new security level into N security levels according to one embodiment of the present invention.

FIG. 4A shows a flowchart or process 400 of inserting a new security level into N security levels according to one embodiment of the present invention. The process 400 can be implemented in software, hardware or both of software and hardware. In a typical application, the process 400 is executed in a security system employed to manage secured files for an enterprise or a group of collaborative business entities.

At 402, the process 400 awaits a request to insert a new security level into N existing security levels. For example, a system was configured to manage secured files classified respectively in accordance with one of N security levels. In other words, there are N security levels in the system. For some reason, the system needs to be configured to manage N+1 security levels, namely a security level is to be added into the N security levels. Upon receiving a request to insert the new security level, the process 400 determines how restrictive the new security level is with respect to the N security levels at 404. It is assumed that the 1st security level in the N security levels is most restrictive while the Nth security level is least restrictive. The relative restrictiveness of the new security level is a relative position in the stack of the N security levels, indicating how less or more restrictive with respect to the 1st security level or the Nth security level.

At 406, a set of security parameters is generated for the new security level. The security parameters include at least a clearance key and a relative security level (e.g., a tier rank). The clearance key may be respectively generated in accordance with FIG. 2C or FIG. 2D or other means known to those skilled in the art. The clearance key is associated with the new security level, and a group of users are then authorized to access secured files classified at this new security level.

At 408, the new security level is now created in the original N security levels, resulting N+1 security levels. Without implicating the accessibility to secured files classified at other security levels, the security levels below the new security level are mapped accordingly. For example, an ith security level in the original N security levels now becomes an (i+1) security level and the corresponding security parameters are also shifted accordingly. In another perspective, SF ∀ (Gi, level i, CKi) is now SF ∀ (G(i+1), level (i+1), CKi). At 410, a new set of security levels is created, which does not implicate the accessibility to secured files originally classified and the originally authenticated users are still able to access the secured files they are entitled to.

Figure 4B:
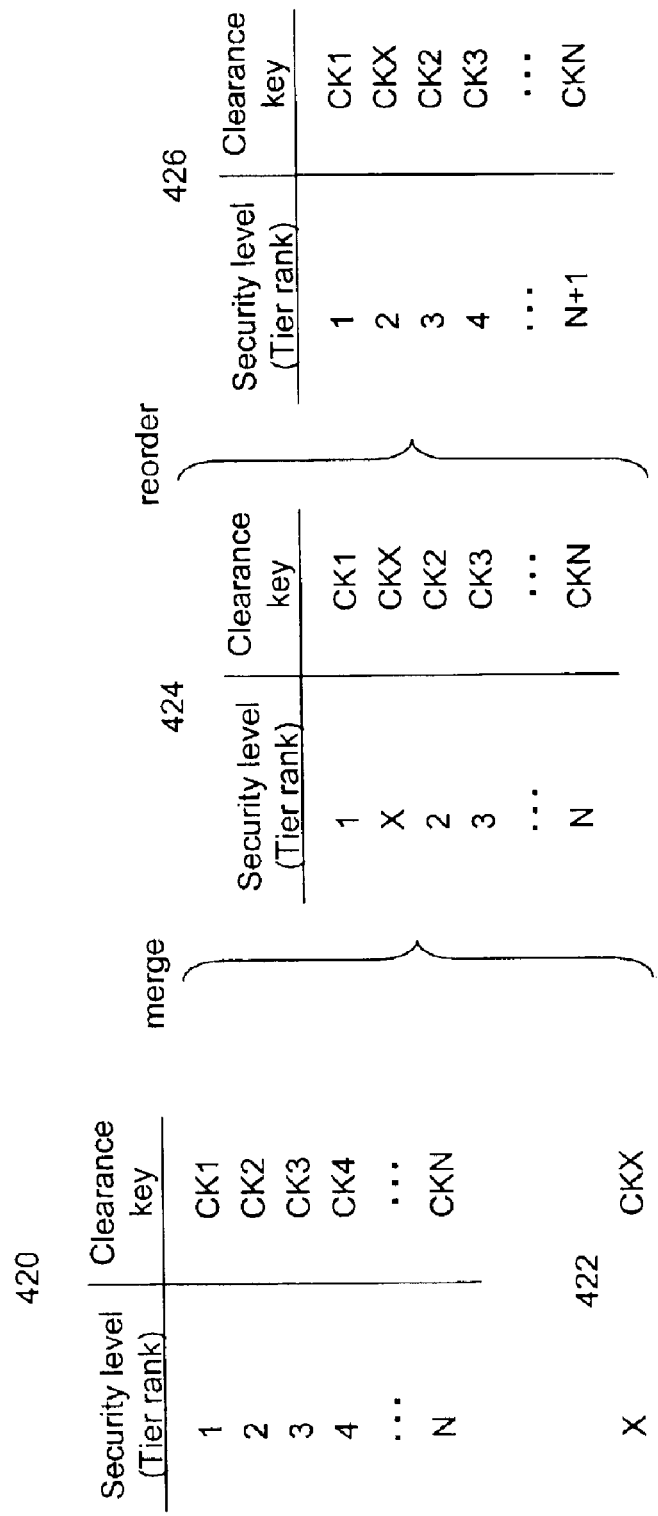
FIG. 4B shows a flowchart or process of deleting a security level out of N security levels according to one embodiment of the present invention.

FIG. 4B is provided to further understand FIG. 4A with respect to one embodiment of the present invention and shows that a table 420 include clearance keys, each for a security level. A set of parameters 422 for a new security level X is generated. It is assumed that the new security level X is to be inserted between security levels 1 and 2. The table 424 shows the relative position of the new security level in the original N security levels in a system. The table 426 shows reordering of the security levels to accommodate the new level that is now with a tier rank being 2 and the corresponding clearance keys are respectively associated with their original ranks. As a result, the secured files classified per the original security levels are still accessible.

According to one embodiment, when an authorized user logins into the system, with the login information in reference to a group, the user is granted at least two keys (a corresponding clearance key and a user key) such that the user can access secured files classified at the granted security level or any levels below this security level. According to another embodiment, when an authorized user logins into the system, with the login information in reference to a group, the user is granted all keys pairs the user is entitled to such that the user can access secured files classified at this security level or any levels below this security level. It should be noted that "granting" herein does not necessarily means only that the user receives the keys from the system. Depending on implementation, one or more of the keys or part or whole of the keys may be stored in a local or remote machine and caused to be activated for use only after the user is authenticated.

Figure 4C:
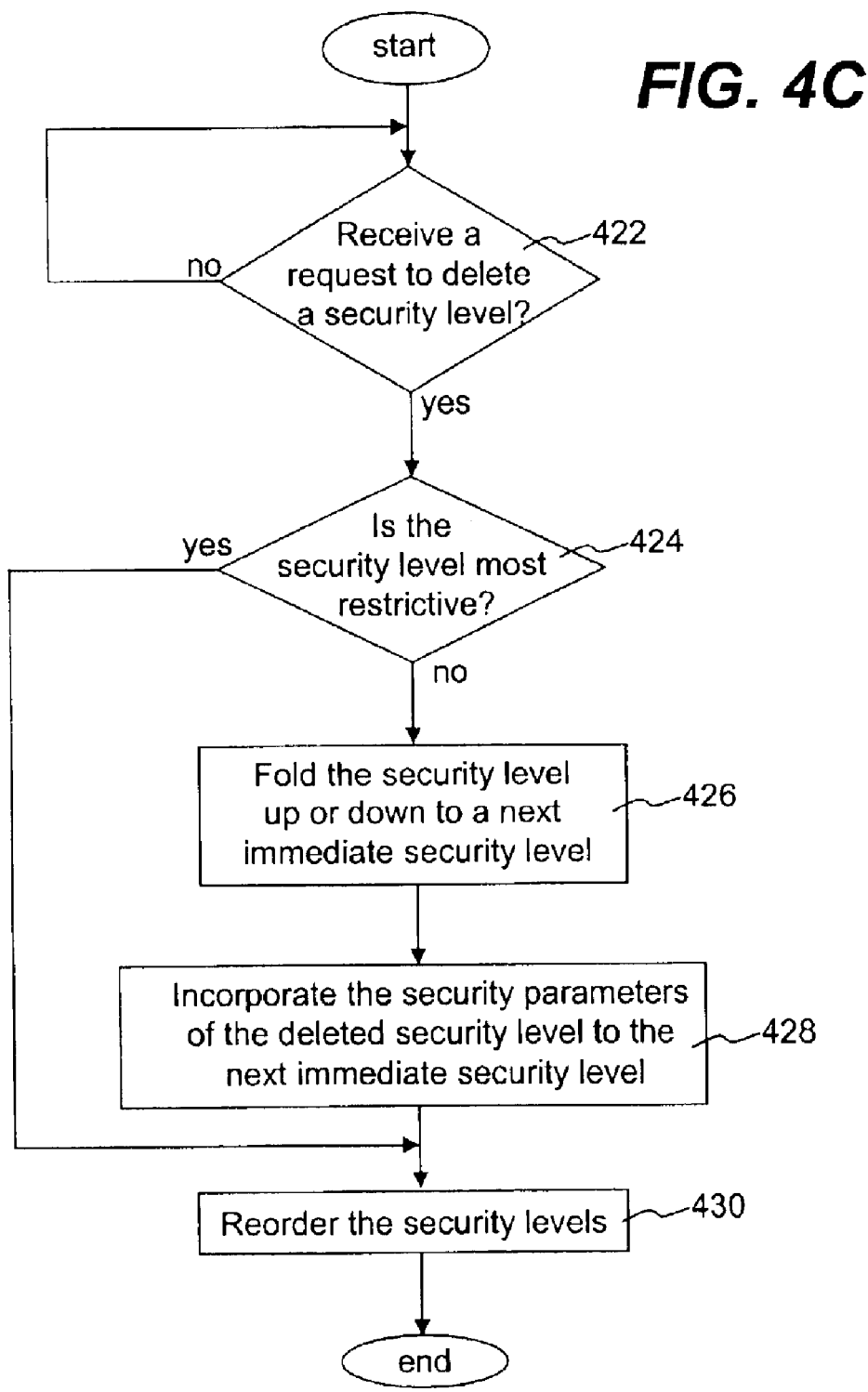
FIG. 4C shows a flowchart or process of deleting a security level out of N security levels according to one embodiment of the present invention.

FIG. 4C shows a flowchart or process 420 of deleting a security level out of N security levels according to one embodiment of the present invention. One of the features of the process 420 is to fold the deleted security level up or down to a next immediate security level so that users originally authorized to access secured files classified at the deleted security level can still access these secured files. The process 420 can be implemented in software, hardware or both of software and hardware. In a typical application, the process 420 is executed in a security system employed to manage secured files for an enterprise or a group of collaborative business entities.

At 422, the process 420 awaits a request to delete a security level out of N existing security levels. For example, a system was configured to manage secured files classified respectively in accordance with one of N security levels. In other words, there are N security levels in the system. For some reason, the system needs to be configured to manage N−1 security levels, namely one of the N security levels is to be deleted. Upon receiving the request to delete, for example, an ith security level, the process 420 determines at 424 whether the ith security level is the most restrictive. It is assumed that the 1st security level in the N security levels is most restrictive while the Nth security level is least restrictive. Accordingly, the process 420 determines at 424 whether the security level to be removed is the 1st security level. If it is indeed the 1st security level, the request is denied.

It should be noted that 424 is not a limitation in the present invention and it can be folded down to a next immediate level. According to one embodiment, it is designed to suit in a more practical situation. In general, it is just not desirable to have a most restrictive security level to be deleted. In some other case, it is also not desirable to have a least restrictive security level to be deleted as well. Optionally, another checking may be employed in the process 420 to determine at 424 whether the security level to be removed is the Nth security level.

Depending on implementation, at 426, the security level to be deleted is to be folded up or down to a next immediate security level. For example, an ith security level to be deleted can be merged with (i−1)th security level or (i+1)th security level. By merging the ith security level with its next immediate security level, it is possible to access those secured files classified at the ith security level even if this level is deleted.

To access those secured files classified at the ith security level, the security parameters, such as the keys and the group designations shall be retained. As a result, at 428, the security parameters for the ith security level are transferred or updated accordingly. In general, for the case of folding up, the security parameters for the ith security level are merged with those for the (i−1)th security level, for the case of folding down, the security parameters for the ith security level are merged with those for the (i+1)th security level. At 430, the security levels are reordered, for example from security levels 1 to N to 1 to (N−1).

Figure 5A:
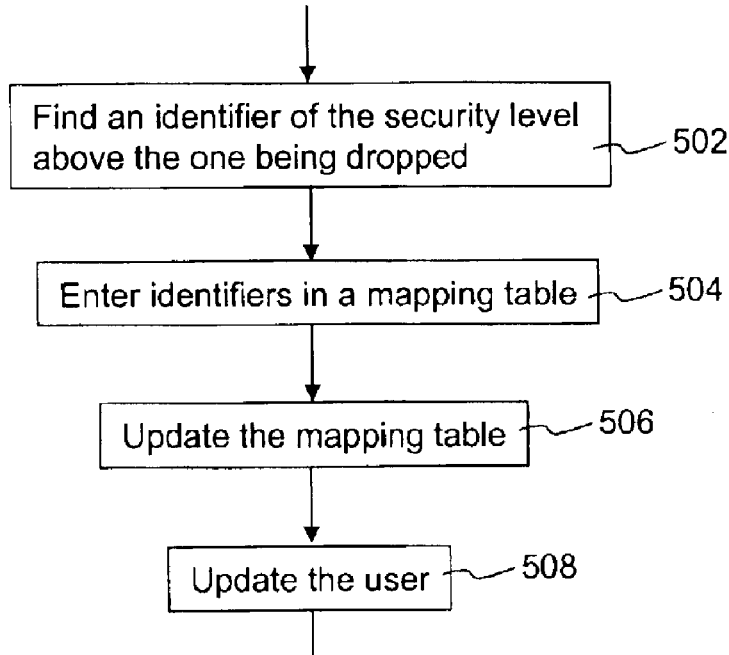
FIG. 5A shows an exemplary implementation of dropping an ith level out of N existing level by folding the ith level to (i—i)th level and may be understood in conjunction with FIG. 5B and FIG. 5C.
Figures 5B, 5C:
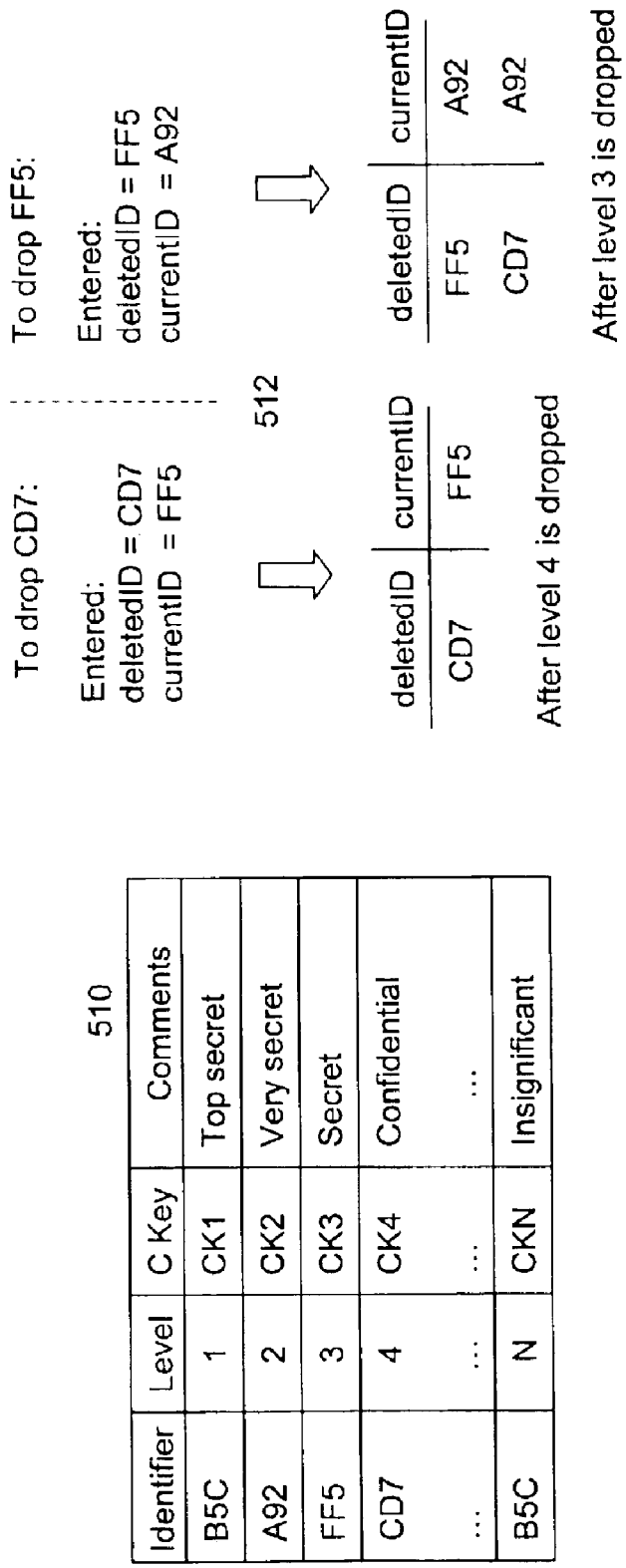
FIG. 5B shows a table listing identifiers, levels, clearance keys and corresponding literal meanings according to one embodiment.
FIG. 5C shows a clearance mapping table being entered and updated.

FIG. 5A shows an exemplary implementation 500 of dropping an ith level out of N existing levels by folding the ith level to (i—i)th level and may be understood in conjunction with FIG. 5B and FIG. 5C. A table 510 in FIG. 5B shows that there are N security levels labeled as Level 1, 2, . . . , N, where Level 1 is most restricted and Level N is least restricted. A security clearance key is associated with one of the security levels. Each of the security levels may mean literally a type of security, such as "top secret", "very secret", . . . "insignificant". Each of the N security levels is also identified by an identifier. According to one embodiment, the identifier is a sequence of digits (e.g. a hexadecimal number) generated in a system. For example in table 510, the identifier B5C indicates security level 1, and the identifier CD7 indicates security level 4. To facilitate the description of FIG. 5A, it is assumed that the ith security level to be dropped is the security level 4.

At 502, an identifier of the security level above the one being dropped is located, namely the identifier of the (i−1)th security level. According to the table 510, the identifier of the 3rd security level is FF5 (i.e., currentID=FF5). Given the two identifiers FF5 and C07, at 504, these two identifiers are entered in a mapping table at 504. FIG. 5C shows a corresponding mapping table 512 which may be referred to as clearance mapping table, in which two IDs (deletedID and currentD) now have two entries, each being one of the two identifiers.

At 506, the mapping table 512 is updated. There is no operation since there are any entries previously in the table 512. At 508, the user who is previously authorized to access secured files classified at CD7 is updated. According to one embodiment, a notification is sent to the user or users who may have been affected by dropping CD7 to cause the original clearance key (i.e. CK4) to be updated or exchanged with another clearance key (e.g., CK3 for FF5). According to another embodiment, when a secured file classified at CD7 is accessed, the original clearance key is used to access the file. At the time, the file is stored, saved or written back to a storage space, an updated clearance key (i.e., the key for FF5) is effectuated in accordance with CurrentID. In any case, the updating at 508 can be configured to be carried out transparently.

Next, it is assumed that another security level, Level 3, is to be dropped. Accordingly, at 502, the identifier (A92) of the security level above Level 3 is located. At 504, these two identifiers are entered, namely deletedID=FF5 and currentD=A92. At 506, the table 512 needs to be updated. Since there is are entries from a previous deletion of one security level, these entries are preferably updated, thus the CurrentID is assigned to be A92 as well as shown in FIG. 5C. The affected user or users are updated at 508 so that these users can still access the secured files classified at FF5.

FIGS. 5A, 5B and 5C show one exemplary implementation of folding up one deleted security level. Given the detailed description herein, other implementations including those to fold down a deleted security level can be readily developed by those skilled in art.

There are numerous features, advantages and benefits in the present invention. One of them is the mechanism provided to regroup security levels per a specific requirement without implicating the accessibility to secured files classified in accordance with the existing security levels. Another one of them is that a security level can be removed from a set of existing security levels while the security parameters for the security level to be deleted are either folded up or down to an immediate next security level. As a result, the security parameters for the immediate next security level are augmented to include those for the security level to be deleted such that the secured files classified at the security level to be deleted can still be accessed by those with proper clearance levels. Other features, advantages and benefits may be appreciated by those skilled in the art in the foregoing descriptions.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

I claim:

1. In a system for providing restrictive access to contents in secured files, each of the secured files classified in accordance with one of N security levels, a method for reorganizing the N security levels without implicating accessibilities to the secured files, the method comprising:

determining a new security level with respect to the N security levels, wherein a 1st security level is most restrictive and an Nth security level is least restrictive in the N security levels;

generating security parameters accordingly for the new security level, the new security level being ith less restrictive with respect to the 1st security level; and mapping ith security level in the N security levels to (i+1)th security level in the N security levels to accommodate the new security level such that there are now (N+1) security levels in the system, wherein each of the secured files includes an encrypted data portion and a security portion that controls restrictive access to the encrypted data portion, the security portion including a file key encrypted by at least a first key and a second key and further protected by a set of rules, and wherein both of the first key and the second key must be obtained by a user whose access privilege is satisfied by the rules before the contents of the each of the secured files can be accessed.

2. The method of claim 1, wherein the security parameters includes at least a clearance key and one or more of the parameters pertain to a designated group of users authorized to access the secured files classified at the new security level.

3. The method of claim 2, wherein the clearance key is associated with the designated group of users, together with a user key associated with each of the users, files secured at the ith security level can now be accessed.

4. The method of claim 2, wherein, when a user authorized to access secured files classified at the new security level logins into the system, the user is granted the clearance key, together with a user key authorized the user to access the secured files, those secured files classified at the new security level can now be access by the users.

5. The method of claim 4, wherein, the clearance key is a private key in a pair of a public key and the private key, those secured files are classified at the new security with the public key.

6. The method of claim 4, wherein, if the user is authorized at ith security level in the original N security levels, the user is now granted a user key and a clearance key such that the contents in the secured files classified at the (i+1)th security level and below can be now accessed by the user.

7. The method of claim 6, wherein the first key determines if the user is authorized to access the secured files classified at one of the N security levels or one of the (N+1) security levels, and the second key is in accordance with the one of the N security levels or the one of the (N+1) security levels.

8. In a system for providing restrictive access to contents in secured files, at least some of the secured files classified in accordance with one of N security levels, a method for reorganizing the N security levels without implicating accessibilities to the secured files, the method comprising:

upon receiving a request to remove an ith security level out of the N security levels, determining if an (i−1)th security level is a 1st security level or if an (i+1)th security level is an Nth security levels, wherein the 1st security level is most restrictive and the Nth security level is least restrictive in the N security levels;

when the (i−1)th security level is not the 1st security level and the (i+1)th security level is not the Nth security levels, merging the ith security level with either the (i−1)th security level or the (i+1)th security level such that there are now (N−1) security levels in the system, wherein each of the secured files includes an encrypted data portion and a security portion that controls restrictive access to the encrypted data portion, the security portion including a file key encrypted by at least a first key and a second key and further protected by a set of rules, and wherein both of the first key and the second key must be obtained by a user whose access privilege is satisfied by the rules before the contents of the each of the secured files can be accessed.

9. The method of claim 8, wherein users authorized to access secured files classified at the ith security level can now access secured files classified at the (i−1)th security level if the ith security level is merged with the (i−1)th security level.

10. The method of claim 8, wherein users authorized to access secured files classified at the ith security level can now access secured files classified at the (i+1)th security level if the ith security level is merged with the (i+1)th security level.

11. The method of claim 8, wherein at least two keys are needed to access secured files classified at the ith security level, after the ith security level is merged with the (i−1)th or (i+1)th security level, the at lest two keys are incorporated into the (i−1)th or (i+1)th security level as such users authorized to access the secured files classified at the ith security level can still access the secured files.

12. The method of claim 11, wherein, at the same time, the users can access secured files classified at the (i−1)th or (i+1)th security level.

13. The method of claim 11, wherein the at least two keys include a first key associated with a designated group of users and a second key being a clearance key in accordance with the ith security level.

14. The method of claim 13, wherein, when the user logins into the system, the user is granted the at least two keys.

15. The method of claim 8, further comprising:
when the (i−1)th security level is the 1st security level,
denying the request to remove the ith security level out of the N security levels; or
always folding down the ith security level with (i−1)th security level.

16. The method of claim 8 further comprising:
when the (i−1)th security level is the N security level,
denying the request to remove the ith security level out of the N security levels; or
always folding up the ith security level with (i−1)th security level.

17. In a system for providing restrictive access to contents in secured files, each of the secured files classified in accordance with one of N security levels, the system comprising:

a first machine loaded with a software module to reorganize the N security levels without implicating accessibilities to the secured files, wherein the 1st security level is most restrictive and the Nth security level is least restrictive in the N security levels, when the software module is executed, the first machine performs operations of:

if a request of deleting an ith security level out of the N security levels is received, determining if an (i−1)th security level is a 1 st security level or if an (i+1)th security level is an Nth security levels, wherein the 1st security level is most restrictive and the Nth security level is least restrictive in the N security levels;

when the (i−1)th security level is not the 1st security level and the (i+1)th security level is not the Nth security levels, merging the ith security level with either the (i−1)th security level or the (i+1)th security level such that there are now (N−1) security levels in the system; and if a request of adding a new security level into the N security is received, determining a new security level with respect to the N security levels, wherein a 1st security level is most restrictive and an Nth security level is least restrictive in the N security levels;

generating security parameters accordingly for the new security level, the new security level being ith less restrictive with respect to the 1st security level;

mapping ith security level in the N security levels to (i+1)th security level in the N security levels to accommodate the new security level such that there are now (N+1) security levels in the system; and a second machine, coupled to the first machine over a network, associated with a user that is granted with at least two keys to access one of the secured files classified at one of the N security levels, wherein each of the secured files includes an encrypted data portion and a security portion that controls restrictive access to the encrypted data portion, the security portion including a file key encrypted by at least a first key and a second key and further protected by a set of rules, and wherein both of the first key and the second key must be obtained by a user whose access privilege is satisfied by the rules before the contents of the each of the secured files can be accessed.

18. The system of claim 17, wherein one of the two keys granted to the user is a clearance key in accordance with the one of the N security levels.

19. The system of claim 18, wherein the two keys granted to the user are folded to either the (i−1)th security level or the (i+1)th security level, when the user is authorized to access secured files classified at the ith security level.

* * * * *